United States Patent [19]

Ishizaka

[11] 4,302,516
[45] Nov. 24, 1981

[54] PROCESS FOR GENERATING ELECTRIC POWER USING AIR AND WATER, AND APPARATUS FOR CARRYING OUT THE PROCESS

[76] Inventor: Otoharu Ishizaka, Tohwa Mansion 1303, 12-12, Hohnan 2-chome, Suginami-ku, Tokyo, Japan

[21] Appl. No.: 178,630

[22] Filed: Aug. 15, 1980

[30] Foreign Application Priority Data

Jan. 25, 1980 [JP]  Japan .................................. 55-6916

[51] Int. Cl.³ .......................................... H01M 16/00
[52] U.S. Cl. ........................................ 429/9; 429/17; 429/27
[58] Field of Search ................................ 429/9, 17, 27

[56] References Cited

U.S. PATENT DOCUMENTS 3,607,403  9/1971  Arrance .................................. 429/9
3,883,368  5/1975  Kordesch et al. ...................... 429/9

FOREIGN PATENT DOCUMENTS 540984  11/1940  United Kingdom .................... 429/9

Primary Examiner—Donald L. Walton
Attorney, Agent, or Firm—Wenderoth, Lind & Ponack

[57] ABSTRACT

Process and apparatus for generating electric power by using air and water. The apparatus comprises a carbon rod, a portion of which is surrounded by an oxidizable and reducible substance and another portion of which is surrounded by an anodic agent; a zinc cylinder surrounding the anodic agent; and an electric pile surrounding the zinc cylinder. After an aqueous electrolyte containing an ammonium complex is placed in the apparatus, the ammonium complex is decomposed on the surface of the electric pile, generating nascent hydrogen, which reacts with oxygen from the air on the surface of the electric pile.

12 Claims, 1 Drawing Figure

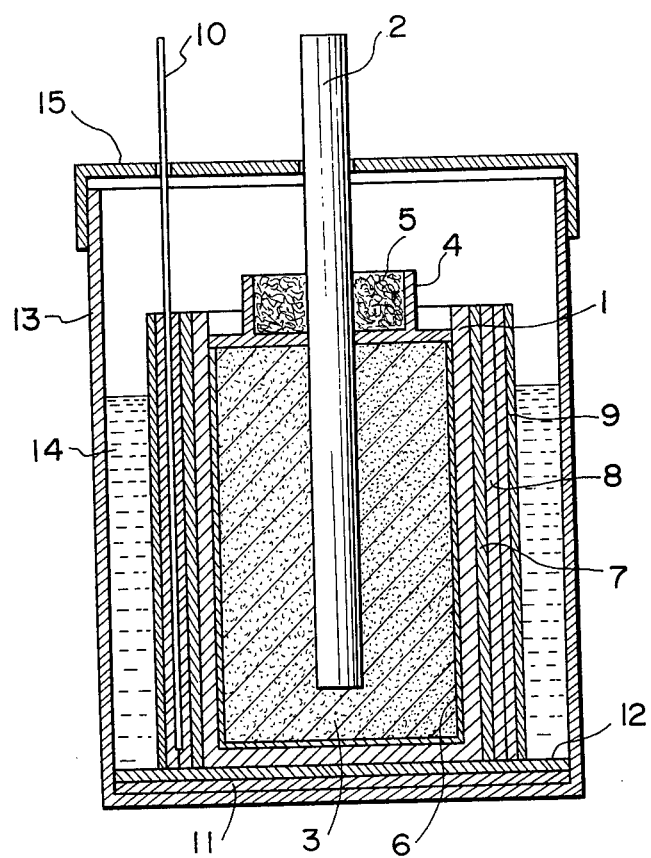

PROCESS FOR GENERATING ELECTRIC POWER USING AIR AND WATER, AND APPARATUS FOR CARRYING OUT THE PROCESS

FIELD OF THE INVENTION

The present invention relates to a process for generating electric power with the assistance of air and water, and an apparatus for generating electric power.

DESCRIPTION OF THE PRIOR ART

A lead secondary battery, previously in wide use, has a relatively simple construction and is easy to handle. However, it is disadvantageous in that it generates effective power only for a short period of time, and furthermore, it is heavy and has poor mechanical properties.

If the weight of the lead secondary battery could be reduced, a great advantage would be obtained.

Also, in recent years, as a source of energy, hydrogen has been attracting great public attention.

When hydrogen is combined with oxygen, a large amount of electrical energy can be obtained. However, in order to carry out the generation of hydrogen and its combustion on an industrial scale, a large-sized apparatus for pressurizing and heating is required.

It is widely known that hydrogen can be generated by the electrolysis of water. However, in the electrolysis of water, electrical energy corresponding to the amount of hydrogen produced is always required, and this electrolysis process is not favorable from an energy efficiency viewpoint.

In Japanese Pat. No. 974,645 (Japanese Patent Publication No. 54-6,993), I disclose a process for generating hydrogen by the electrolysis of water, which comprises joining stainless steel or iron with metallic zinc, these metals being capable of producing a contact voltage and current because of their difference in ionization potential, and inserting the joined metal composite into an ammoniacal alkaline electrolytic aqueous solution comprising neutral ammonium carbonate or neutral ammonium carbonate with ammonium hydroxide added thereto.

SUMMARY OF THE INVENTION

An object of the present invention is to provide a process for permanently generating electric power using an apparatus for generating electric power which has a new construction capable of overcoming all of the above-mentioned defects.

The present invention was accomplished by use of the above-mentioned knowledge as a starting point.

In accordance with the present invention, there is provided a new oxygen-hydrogen fuel cell, which utilizes hydrogen produced by the above-mentioned electrolysis of water, in combination with a conventional battery, for example, a zinc-manganese dioxide primary battery.

That is, the apparatus for generating electric power according to the present invention is characterized in that the electrolyte comprises an ammoniacal alkaline aqueous solution containing an ammonium complex whose metal component is selected from the group consisting of zinc, cobalt, nickel, manganese and silver, the negative pole comprises an electric pile selected from the group consisting of aluminum-zinc, aluminum-manganese, aluminum-cobalt, aluminum-nickel and aluminum-silver, and the positive pole comprises a carbon rod and a medium of an oxidizable and reducible metal oxide of oxidizable and reducible organic material, and a conventional anodic agent such as manganese dioxide.

BRIEF DESCRIPTION OF THE DRAWING

The drawing is a diagrammatic view illustrating an example of the apparatus for generating electric power according to the present invention, in which:

| | |
|---|---|
| (1) Zinc cylinder | (2) Carbon rod |
| (3) Anodic agent | (4) Flat plate with cylinder thereon |
| (5) Impregnated absorbent cotton | (6) Japanese paper |
| (7) Electric pile | (8) Stainless steel mesh |
| (9) Aluminum plate | (10) Aluminum rod |
| (11) Stainless steel mesh | (12) Aluminum plate |
| (13) Plastic container | (14) Electrolyte |
| (15) Lid | |

DETAILED DESCRIPTION OF THE INVENTION

The process for generating electric power in accordance with the present invention comprises providing an electrolyte comprising an ammoniacal alkaline aqueous solution containing an ammonium complex having a central metal atom selected from the group consisting of zinc, cobalt, nickel, manganese and silver; providing a negative pole comprising an electric pile selected from the group consisting of an aluminum-zinc composite, an aluminum-manganese composite, an aluminum-cobalt composite, an aluminum-nickel composite and an aluminum-silver composite; providing a positive pole comprising a carbon rod, one portion of said carbon rod being surrounded by a metal oxide or organic material which is both oxidizable and reducible, and another portion of said carbon rod being surrounded by an anodic agent; decomposing said ammonium complex, from said electrolyte, on the surface of said electric pile, to generate nascent hydrogen; and reacting said nascent hydrogen with oxygen on the surface of said electric pile.

The apparatus for generating electric power in accordance with the present invention comprises, as a positive pole, a carbon rod, a portion of said carbon rod being surrounded by a metal oxide or organic material which is both oxidizable and reducible, and another portion of said carbon rod being surrounded by an anodic agent; a negative pole comprising (1) a zinc cylinder which surrounds the periphery and bottom of said anodic agent, the inside surface of said zinc cylinder being lined with an air-permeable material, for example Japanese paper, a porous or perforated synthetic resin (e.g. a porous or perforated plastic film of polyethylene or polypropylene) or a woven or non-woven fibrous web, (2) an electric pile selected from the group consisting of an aluminum-zinc composite, an aluminum-manganese composite, an aluminum-cobalt composite, an aluminum-nickel composite and an aluminum-silver composite, which surrounds the periphery of said zinc cylinder, (3) a stainless steel mesh surrounding the periphery of said electric pile, and (4) as a negative terminal, an aluminum rod in contact with said stainless steel mesh; a container for housing said positive and negative poles; and an electrolyte in contact with said negative pole, said electrolyte comprising an ammoniacal alkaline aqueous solution containing an ammonium complex having a central metal atom selected from the group consisting of zinc, cobalt, nickel, manganese, and silver.

In accordance with the present invention, the negative pole is an electric pile selected from the group consisting of aluminum-zinc, aluminum-manganese, aluminum-cobalt, aluminum-nickel and aluminum-silver. It is preferable that a mesh made of stainless steel is positioned in the vicinity of the electric pile because the durability of the negative pole is thereby increased. Also, it is preferable that the stainless steel mesh is surrounded at its outer surface with an aluminum plate because the recovery of electric current is thereby promoted.

The positive pole is prepared by enclosing a section of a terminal made of a carbon rod with an absorbent cotton impregnated with an ammoniacal alkaline aqueous solution or suspension containing an oxidizable and reducible metal oxide or an oxidizable and reducible organic material, and combining the enclosed mass with, for example, a manganese dioxide-graphite-ammonium chloride composition, which is a conventional anodic agent for a manganese dry battery. This anodic agent may contain, by weight, 80-85% manganese dioxide, 13-14% graphite, 2-5% ammonium chloride and 0-1% glycerin.

As an electrolyte, use is made of an ammoniacal alkaline aqueous solution of an ammonium complex whose central metal component is selected from the group consisting of zinc, cobalt, nickel, manganese and silver. The electrolyte is prepared by dissolving zinc oxide, cobalt oxide, nickel oxide, manganese oxide or silver oxide in an aqueous solution of ammonium hydroxide.

Preferable, but not necessarily, the non-aluminum metal of the electric pile is the same as the central metal atom of the ammonium complex contained in the electrolyte.

In the apparatus for generating electric power according to the present invention, the ammonium complex from the electrolyte is decomposed on the surface of the above-mentioned electric pile to generate hydrogen. Then the hydrogen, in nascent state, before it is converted into hydrogen gas in the free state, is allowed to react with oxygen, from the air, on the surface of the electric pile.

For reference purposes, it is estimated that the following reactions, in which M represents a metal atom, e.g. zinc, are carried out in the process and apparatus of the present invention.

In the vicinity of the negative pole:

$$[Al(NH_3)_6H_6](OH)_6 + 2MO \rightarrow 2M + 2H_2O + [Al(NH_3)_6H_2](OH)_2 + 4OH^- \quad (1.)$$

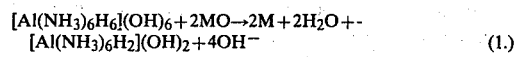

$$[M(NH_3)_6H_2](OH)_2 + 4OH^- + 2H_2O \rightarrow MO + [O]^{2-} + 6NH_4OH \quad (2.)$$

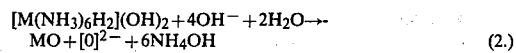

$$M + 6NH_4OH \rightarrow [M(NH_3)_6H_6](OH)_6 \quad (3.)$$

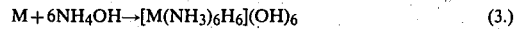

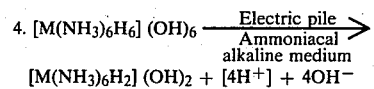

4. $[M(NH_3)_6](OH)_6 \xrightarrow[\text{Ammoniacal alkaline medium}]{\text{Electric pile}} [M(NH_3)_6H_2](OH)_2 + [4H^+] + 4OH^-$ In the vicinity of the positive pole:

$$MO + O_2 \rightarrow MO_2 + O^{2-} \quad (1.)$$

$$MO_2 + O^{2-} + [4H]^+ \rightarrow MO + 2H_2O \quad (2.)$$

From the foregoing, it is considered that an electron migrates from the negative pole to the positive pole, and thus, an electric current passes from the positive pole to the negative pole.

Naturally, the hydrogen gas produced from catalytic reaction on the surface of the negative and positive poles is so active or nascent that, on the surface of the electric pile catalyzer, it will very quickly combine with oxygen from the air and produce electricity as well as water molecules, and thus the electric current may be increased to run from positive to negative poles. Consequently, it is preferable to remove almost all of the ammoniacal alkaline aqueous solution of metallic ammonium complex from the apparatus after about one hour reaction with the pile-metals.

Experimentally, it has been proved that this theory is correct. Conversely, no electricity can be generated in the absence of moisture.

The apparatus for generating electric power according to the present invention is operated at normal temperature under normal pressure, which is very advantageous.

The present invention will be illustrated by the following examples, but it is not intended to be limited thereto.

EXAMPLE 1

(A) Preparation of electrolyte

Zinc oxide was added to an aqueous solution having a concentration of 3% ammonia, in a ratio of 1:500 (weight in grams: volume in milliliters), at room temperature to prepare an ammoniacal alkaline aqueous solution of a zinc-ammonium complex, $[Zn(NH_3)_6H_6](OH)_6$.

(B) Preparation of aluminum-zinc electric pile 0.1 g of zinc oxide was added to 50 ml of an aqueous solution having a concentration of 2% ammonia. Upon standing at room temperature for at least about 1 hour, the zinc oxide in the mixture was dissolved, and an ammoniacal alkaline aqueous solution of the zinc-ammonium complex as in (A) above was obtained.

An aluminum plate was immersed in this solution to deposit zinc on the surface of the plate, thereby producing the Al-Zn electric pile.

(C) Fabrication of apparatus for generating electric power

The apparatus for generating electric power according to the present invention is diagrammatically shown in the drawing.

Referring to the drawing, a conventional anodic agent 3 consisting of manganese dioxide ($MnO_2$), graphite and ammonium chloride ($NH_4Cl$) is filled around the lower portion of a carbon rod 2 in a zinc cylinder 1 having a bottom, as is the case with a conventional primary dry battery. A flat sheet 4 made of vinyl resin which has a cylinder thereon is placed in the upper portion of the zinc cylinder 1 to cover the anodic agent 3, and the inside of the cylinder of 4 is filled with an absorbent cotton 5 which is impregnated with an ammoniacal alkaline aqueous suspension containing manganese oxide (MnO) powder.

The inside surface of the zinc cylinder 1 is lined with Japanese paper 6, and the outside surface of the zinc cylinder 1 is surrounded with the above-mentioned prepared aluminum-zinc electric pile 7 whose outside surface is, in turn, surrounded with double windings of a stainless steel mesh 8.

Further, the outside surface of the outside winding of the stainless steel mesh 8 is surrounded with an aluminum plate 9.

An aluminum rod 10 serving as a terminal of the negative pole is inserted between the double windings of the stainless steel mesh 8.

The assembly is placed in a plastic container 13 provided with a stainless steel mesh 11 and an aluminum plate 12 at the inside of the bottom thereof.

Then, the electrolyte 14, prepared as described above, is poured into the space between the outside surface of the assembly and the inside surface of the container so as to reach a level equivalent to about 70% of the height of the negative pole portion, and a lid 15 is fitted onto the container in such a manner that the inside of the container can be freely opened to the surrounding atmosphere.

The electrolyte 14 flows underneath the aluminum plate 9, then along the aluminum plate 12, and then, by capillary action, it travels upwards between the zinc cylinder 1 and the electric pile 7, upwards between the electric pile 7 and the first winding of stainless steel mesh 8, upwards between the two windings of stainless steel mesh 8, and upwards between the second winding of stainless steel mesh 8 and the aluminum plate 9. When the electrolyte 14 contacts the electric pile 7, hydrogen is generated as follows:

$$[Zn(NH_3)_6H_6](OH)_6 \rightarrow [Zn(NH_3)_6H_2](OH)_2 + [4H]^+ + 4OH^-$$

(D) Performance of the apparatus

The apparatus for generating electric power was tested under a load required to rotate a 0.01 Hp motor to determine the voltage and current with the lapse of time. The results are shown in Table 1.

TABLE 1

| Time (hr) | 1 | 5 | 10 | 12 | 15 | 20 |
|---|---|---|---|---|---|---|
| Voltage (V) | 1.5 | 1.5 | 1.4 | 1.4 | 1.4 | 1.4 |
| Current (A) | 4.0 | 3.8 | 3.6 | 3.0 | 3.0 | 3.0 |

After the lapse of 20 hours, the apparatus was discharged in air at normal temperature and pressure.

After the lapse of 2 hours from the discharge, the apparatus was again tested. The results shown in Table 1 were reproduced.

The above-mentioned tests indicate that the apparatus for generating electric power according to the present invention absorbs oxygen from the air at normal temperature and pressure, whereby the apparatus is charged.

Additionally, the zinc coordinate compound, produced along with hydrogen during decomposition of the zinc-ammonia complex on the surface of the electric pile, is converted back into the zinc-ammonia complex, as follows:

$$[Zn(NH_3)_6H_2](OH)_2 + 4OH^- + 2H_2O \rightarrow ZnO + [O]^{2-} + 6NH_4OH$$

$$Zn + 6NH_4OH \rightarrow [Zn(NH_3)_6H_6](OH)_6$$

Thus, there is a cyclic system involved here which results in generation of hydrogen. By this procedure, the solar thermic energy is changed to electric power energy through a so-called combustion form of nascent hydrogen with the air-oxygen on the surface of electric pile catalyzer at normal temperature-pressure.

For comparison purposes, the change in voltage and current with the lapse of time for a conventional manganese battery is shown in Table 2.

TABLE 2

| Time (hr) | 1 | 5 | 10 | 12 | 13 |
|---|---|---|---|---|---|
| Voltage (V) | 1.5 | 1.4 | 1.4 | 1.3 | 1.0 |
| Current (A) | 4.0 | 3.8 | 3.8 | 2.8 | 1.8 |

EXAMPLE 2

The same procedures as those described in Example 1 were repeated, except that pyrogallol was used instead of manganese oxide (MnO). The test results are shown in Table 3.

TABLE 3

| Time (hr) | 0.5 | 1 | 5 | 10 | 20 |
|---|---|---|---|---|---|
| Voltage (V) | 1.54 | 1.5 | 1.4 | 1.4 | 1.4 |
| Current (A) | 4.4 | 4.2 | 4.0 | 3.5 | 2.4 |

In addition, it was found that charging of the apparatus can be favorably carried out when several milliliters of an aqueous solution having a concentration of 2% ammonia alone is used in the portion of the positive pole side of the apparatus corresponding to that originally occupied by the ammoniacal alkaline aqueous suspension of manganese oxide or pyrogallol, and the aqueous electrolyte for the negative pole, which has been poured into the container so as to reach a level of about 70% of the height of the negative pole portion, is removed from the negative pole side after the negative pole portion is immersed in the electrolyte for about one hour.

The electric power of the present apparatus will depend on the materials employed. For example, if the oxidant is composed of $MnO_2$-graphite-$NH_4Cl$, like that of a conventional Mn-Zn electric cell, and if the positive pole is a carbon rod whose upper portion is surrounded by an $MnO$-$NH_4OH$ suspension as indicated at 5 in the drawing, then the voltage of the apparatus will be over 1.6 V and its current over 4.1 A.

This data was proved by experimentation.

In the apparatus for generating electric power according to the present invention, by changing the concentration of ammonia used in the production of the electrolyte, it is possible to control the voltage and current of the apparatus. The concentration of ammonia is preferably in the range of from 0.1 to 5% by weight, and the temperature of the electrolyte is preferably in the range of from 10° to 40° C.

As is apparent from the foregoing description, in accordance with the present invention it is possible to attain a cyclic generation of electric power at normal temperature and normal pressure using water and air. In addition, the apparatus itself can be charged at normal temperature and normal pressure. Furthermore, the weight of the apparatus of the present invention is only about 20% that of a conventional lead secondary battery.

I claim:

1. A process for generating electric power, which comprises providing an electrolyte comprising an ammoniacal alkaline aqueous solution containing an ammonium complex having a central metal atom selected from the group consisting of zinc, cobalt, nickel, manganese and silver, providing a negative pole comprising an electric pile selected from the group consisting of an aluminum-zinc composite, an aluminum-manganese composite, an aluminum-cobalt composite, an aluminum-nickel composite and an aluminum-silver composite, providing a positive pole comprising a carbon rod, one portion of said carbon rod being surrounded by a member selected from the group consisting of a metal oxide and an organic material which are both oxidizable and reducible, and another portion of said carbon rod being surrounded by an anodic agent, decomposing said ammonium complex, from said electrolyte, on the surface of said electric pile, to generate nascent hydrogen, and reacting said nascent hydrogen with oxygen on the surface of said electric pile.

2. A process of claim 1, wherein the concentration of ammonia in the ammoniacal alkaline aqueous solution is from 0.1 to 5% by weight.

3. A process of claim 1, wherein the process is carried out at a temperature of from 10° to 40° C.

4. A process of claim 1, wherein the metal oxide is manganese oxide.

5. A process of claim 1, wherein the organic material is pyrogallol.

6. A process of claim 1, wherein the anodic agent is a composition containing manganese dioxide, graphite and ammonium chloride.

7. An apparatus for generating electric power, which comprises as a positive pole, a carbon rod, a portion of said carbon rod being surrounded by a member selected from the group consisting of a metal oxide and an organic material which are both oxidizable and reducible, and another portion of said carbon rod being surrounded by an anodic agent, a negative pole comprising (1) a zinc cylinder which surrounds the periphery and bottom of said anodic agent, the inside surface of said zinc cylinder being lined with an air-permeable material, (2) an electric pile selected from the group consisting of an aluminum-zinc composite, an aluminum-manganese composite, an aluminum-cobalt composite, an aluminum-nickel composite and an aluminum-silver composite, which surrounds the periphery of said zinc cylinder, (3) a stainless steel mesh surrounding the periphery of said electric pile, and (4) as a negative terminal, an aluminum rod in contact with said stainless steel mesh, a container for housing said positive and negative poles, and an electrolyte in contact with said negative pole, said electrolyte comprising an ammoniacal alkaline aqueous solution containing an ammonium complex having a central metal atom selected from the group consisting of zinc, cobalt, nickel, manganese and silver.

8. An apparatus of claim 7, wherein the negative pole further comprises an aluminum plate surrounding the periphery of said stainless steel mesh.

9. An apparatus of claim 7, wherein the metal oxide is manganese oxide.

10. An apparatus of claim 7, wherein the organic material is pyrogallol.

11. An apparatus of claim 7, wherein the anodic agent is a composition containing manganese dioxide, graphite and ammonium chloride.

12. An apparatus of claim 7, wherein the air-permeable material is a member selected from the group consisting of Japanese paper, a porous or perforated synthetic resin, and a woven or non-woven fibrous web.

* * * * *